Feb. 5, 1963  B. LEIBINGER ET AL  3,076,367
WORK FEED DEVICE FOR RECIPROCATING MACHINE TOOL
Filed Nov. 19, 1958
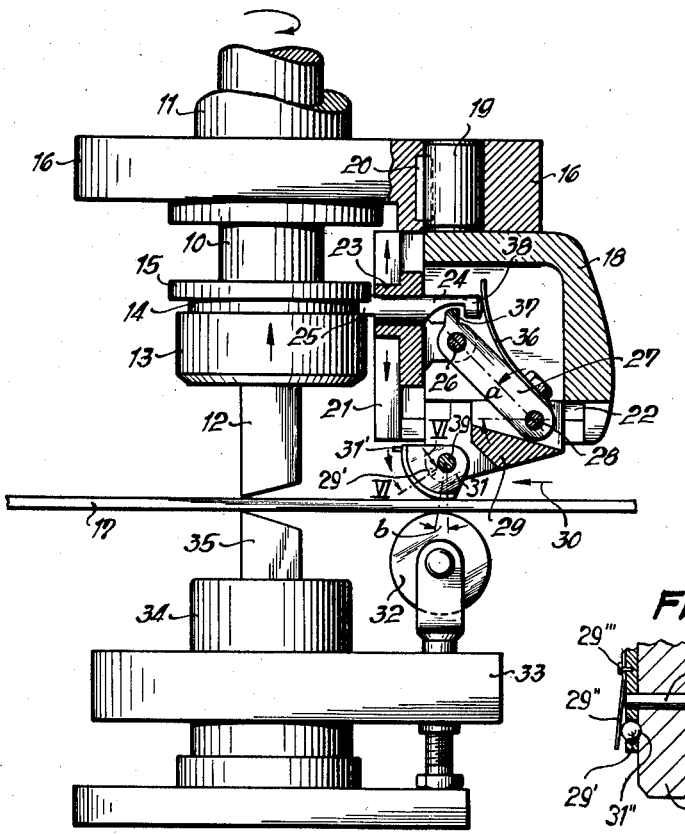
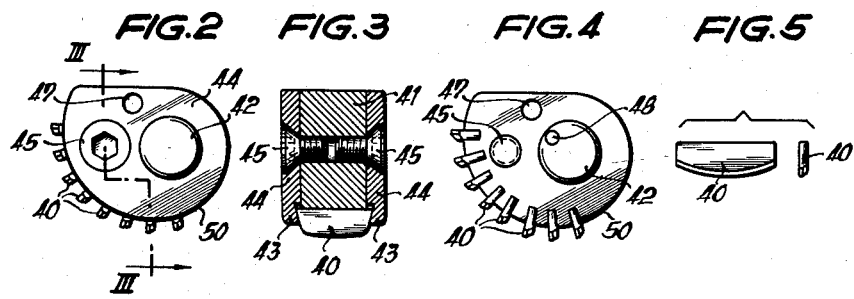
INVENTORS
Berthold Leibinger
Eugen Herb
by: Michael S. Striker
Attorney United States Patent Office 3,076,367
Patented Feb. 5, 1963

3,076,367
WORK FEED DEVICE FOR RECIPROCATING MACHINE TOOL
Berthold Leibinger, Stuttgart-Weilimdorf, and Eugen Herb, Hausen (Fils), Germany, assignors to Messrs. Trumpf & Co.
Filed Nov. 19, 1958, Ser. No. 774,923
Claims priority, application Germany, Feb. 1, 1958
7 Claims. (Cl. 83—227)

The present invention relates to machines where a tool is reciprocated back and forth along working and reverse strokes and wherein the work material is intermittently fed with respect to the tool. For example, in punch presses the punch is moved back and forth with respect to the die and while the punch is moving along its return strokes the work is fed so as to be in the proper position for the next working stroke of the punch. Also, in shears a shearing element is moved back and forth to cut the work, and while the movable shear member is moved away from a stationary shear member along the return stroke of the movable shear member the work is fed so as to be in a proper position to be cut during the next working stroke of the movable shear member.

It is conventional in machines of this type to feed the work by hand. Because the work must be fed intermittently in stepwise fashion during the return strokes of the movable tool it is not possible to provide a continuously operating feeding means for feeding the work.

One of the objects of the present invention is to provide a machine of the above type with a feeding means which is fully automatic and which is capable of feeding the work in stepwise fashion intermittently only during the return strokes of the tool so that the work will be automatically placed in a proper position for the next working stroke of the tool, and in this way the manual operations required are greatly reduced.

Another object of the present invention is to provide an automatic feed of the above type which is actuated in synchronism with the movement of the tool.

A further object of the present invention is to provide an automatic feed of the above type which will automatically adapt itself to workpieces of different dimensions.

An additional object of the present invention is to provide an automatic feed of the above type with work engaging elements which can be easily exchanged when they become worn and which will not become worn substantially until after they have been used for a relatively long time.

With the above objects in view the present invention includes in a machine which repeatedly moves a tool through a cycle including a work stroke and a return stroke, a machine part which moves in synchronism with the tool and a work feeding means actuated by the machine part to feed the work only during the return strokes of the tool.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly sectional side elevational view of an automatic feed according to the present invention shown connected with a machine for automatically moving the work;

FIG. 2 is a side elevational view of a work-engaging structure of the present invention;

FIG. 3 is a transverse sectional view taken along line III—III of FIG. 2 in the direction of the arrows;

FIG. 4 shows a work-engaging structure with a side plate thereof removed;

FIG. 5 shows the construction of a work-engaging tooth; and

FIG. 6 is a fragmentary sectional view taken along line VI—VI of FIG. 1 in the direction of the arrows.

Referring now to FIG. 1, there is shown therein a tool carrier means 10 which is vertically slidable in a stationary sleeve 11. The tool carrier means 10 carries in any suitable known way a tool 12 which reciprocates with the tool carrier means 10 repeatedly through a cycle which includes a downwardly directed work stroke and an upwardly directed return stroke of the tool 12, as viewed in FIG. 1. In the illustrated example the tool 12 may be a movable shear member which cooperates with a stationary shear member 35 to cut the work sheet 17.

A motion transmitting member 13 is fixed to the tool carrier means 10 for reciprocating therewith, and this motion transmitting member 13 is in the form of a ring surrounding the tool carrier means 10. A suitable set screw may extend radially through the ring 13 into engagement with the tool carrier means 10 for fixing the ring 13 to the tool carrier means 10 at any desired axial position therealong. The tool carrier means 10 may be provided with an external thread cooperating with an internal thread of the ring 13 so that after the set screw is loosened the ring 13 may be turned so as to have its axial position along the tool carrier means 10 adjusted, and then the set screw may be tightened to fix the ring 13 in the desired axial position. The ring 13 is formed with a cutout 14 in the form of an annular groove at the exterior of the ring 13, and this groove is located between a pair of portions of the ring 13 with the upper portion 15 at the side of the groove 14 opposite from the plane in which the work sheet 17 is located extending to a greater radial distance from the axis of the tool carrier means 10 than the portion of the ring 13 immediately below the groove 14.

The sleeve 11 which guides the tool carrier means 10 is provided at its bottom end with an outwardly directed flange on which a plate 16 rests, this plate 16 being formed with an opening through which the sleeve 11 passes, and it is therefore possible to turn the plate 16 around the axis of the sleeve 11. A housing 18 is fixed to the plate 16 between the latter and the plane of the work sheet 17, and for this purpose the housing 18 has at its top end a pin 19 extending into a bore of the plate 16. A key 20 is located partly in a recess of the plate 16 and partly in a recess of the pin 19 to fix the housing 18 to the plate 16, this key 20 being inserted into the position thereof illustrated in FIG. 1 through an opening in the plate 16.

The housing 18 is formed with a first guide means 21 extending parallel to the axis of the tool carrier means 10. This guide means 21 is in the form of a slot of substantially T-shaped configuration in cross section extending vertically throughout the entire height of the housing 18, the wider part of the T-slot 21 being located more distant from the axis of the tool carrier means 10 than the narrow part of this T-slot. A carriage 23 which is of a mating T-cross section is slidable back and forth along the guide means 21, so that the latter together with the carriage 23 form a carriage means movable back and forth parallel to the axis of the tool carrier means 10. The housing 18 also has a second guide means 22 in the form of an elongated T-slot, this guide means 22 extending radially with respect to the axis of the tool carrier means 10. The wider part of the T-slot 22 is located at a higher elevation than the narrow part thereof.

The carriage 23 is formed with a bore passing therethrough and extending radially with respect to the axis of the tool carrier means 10, and a pin 24 is slidable in this bore and extends through and beyond the carriage 23. At its left end, as viewed in FIG. 1, the pin 24 terminates in a portion 25 of reduced cross section extending into the cutout 14 so that the carriage 23 is constrained to reciprocate with the tool carrier means 10. Thus, the ring 13 forms a machine part which moves in synchronism with the tool 12 and which is operatively connected through the pin 24 with the carriage 23 to move the latter together with the tool carrier means 10.

A pivot pin 26 serves to pivotally connect the carriage 23 with one end of a link 27. This link 27 extends into a slot formed in the pin 24, and the pin 26 is carried by the carriage 23 in a position extending across this slot through the link 27. The end of the link or connecting rod 27 distant from the carriage 23 is pivotally connected by a pivot pin 28 to a second carriage 29 having a T-shaped cross section mating with the T-slot 22 so that the carriage 29 is movable back and forth radially with respect to the axis of the tool carrier means 10 along the guide means 22. Thus, the guide means 22 together with the carriage 29 form a carriage means movable toward and away from the working station of the machine. The pivot pin 28 is carried by the carriage 29 in a position extending across a slot of the carriage 29 into which the link 27 extends. Thus, when the carriage 23 moves downwardly the carriage 29 will be moved by the link 27 to the right, as viewed in FIG. 1, away from the working station of the machine, while when the carriage 23 moves upwardly the link 27 will transmit the motion of the carriage 23 to the carriage 29 for shifting the latter to the left, as viewed in FIG. 1, toward the axis of the tool carrier means 10. It will be noted that when the carriage 23 is at the elevation of the carriage 29, the latter is displaced by a substantial distance to the right of the carriage 23 so that the pair of carriages cannot engage each other. Any suitable structure is provided to prevent the carriage 23 from moving into the interior of the housing 18 and to prevent the carriage 29 from moving into the interior of the housing 18. Thus, the carriage 29 can be provided at its opposite side faces with outwardly directed ribs which slidably engage the underside of the housing 18, so that the carriage 29 cannot move upwardly, as viewed in FIG. 1. Also, the housing 18 can be provided at its interior with a pair of ribs extending parallel to the T-slot 21 and overlapping opposite side edges of the carriage 23 at the right face thereof, as viewed in FIG. 1, so that the carriage 23 cannot move to the right, as viewed in FIG. 1, inwardly toward the interior of the housing 18.

The carriage 29 carries a work-engaging member 31 which may be in the form of an eccentrically mounted disc, a rotary wedge member, or a clamping pawl. This work-engaging member 31 is pivotally carried by the carriage 29 on a pivot pin 39 which is carried by the carriage 29 in a position extending across a slot of the carriage 29 into which the member 31 extends in a manner shown in FIG. 1. Thus, during movement of the carriage 29 the pin 39 remains at all times at the same distance from the plane in which the work sheet 17 is located. The work-engaging member 31 has a work-engaging periphery directed toward and engaging the work sheet 17 at the upper face thereof. This work sheet 17 rests, in part, on a supporting roll 32 whose elevation is adjustable. This roll 32 is carried by a plate 33 which is arranged coaxially with respect to the tool carrier means 10 on the support 34 which carries the lower stationary tool 35. The plate 33 is carried by the support 34 for turning movement around the axis of the tool carrier means 10.

When the tool 12 moves downwardly along its working stroke, the carriage 29 will be shifted to the right, as viewed in FIG. 1, and the shape of the peripheral work-engaging portion of the member 31 is such that the member 31 tends to turn in a clockwise direction at this time, as viewed in FIG. 1, so as to eliminate any friction between element 31 and the work sheet, and thus at this time the member 31 slides freely along the work sheet 17. However, when the tool 12 moves upwardly along its return stroke, the direction of movement of the carriage 29 is reversed so that the carriage 29 moves toward the work station, in the direction of the arrow 30 of FIG. 1, and at this time the work-engaging periphery of the member 31 cooperates with the sheet 17 in a manner tending to turn the member 31 in a counter clockwise direction, as viewed in FIG. 1, so that this movement increases the frictional contact between the member 31 and the plate 17. Therefore, only when the carriage 29 moves in the direction of arrow 30 is the work sheet 17 clamped between the member 31 and the roll 32 to be fed by the feed structure of the invention with respect to the tool 12 while the latter is moving along its return stroke. Thus, it will be seen that the housing 18 and the structure carried thereby forms a work-engaging and feeding means which is operatively connected with the tool 12 through the machine part 13 to move the work only during the return stroke of the tool 12.

As may be seen from FIG. 1, the point of engagement between the member 31 and the work sheet 17 is located slightly to the left of the axis of the pivot pin 39, so that a line drawn through the axis of the pivot pin 39 normal to the plane of the work sheet 17 and a line drawn through the axis of the pivot pin 39 and extending through the point of engagement between the member 31 and the work sheet 17 will define the angle $b$ between themselves. In order to guarantee that this angle $b$ remains substantially the same irrespective of which peripheral portion of the member 31 engages the work sheet, the periphery of the member 31 which engages the work sheet 17 extends along a logarithmic spiral. With a periphery of this curvature each of the points of the periphery of the member 31 which engage the work sheet will always make the angle $b$ shown in FIG. 1 where the lines are drawn as indicated in FIG. 1. Thus, with this construction no special adjustments of any type are required for work sheets of different thickness. Irrespective of the thickness of the work sheet and irrespective of changes in the thickness from one work sheet to the next the member 31 will automatically assume a position where it cooperates with the work sheet to press the latter downwardly against the roll 32 over the axis thereof, and the angle $b$ will remain substantially the same irrespective of the thickness of the work sheet.

A small lever 31' may be connected, as shown in FIG. 1 to the element 31 for moving the latter downwardly toward its operating position or for raising the latter upwardly to an inoperative position so that when the member 31 is in its latter inoperative position the work sheet 17 can be moved freely by the operator. Also, any suitable device may be provided for releasably holding the member 31 in an upper idle position where it does not interfere with the movement of the sheet 17 by the operator, so that the sheet 17 can be freely moved to and away from the machine. For example, any suitable ball and detent device may cooperate with a peripheral or side portion of the member 31 or with the pivot pin 39 which would in this case be fixed to the member 31 to turn therewith in order to releasably hold the member 31 in an upper inoperative position. In the example illustrated in FIG. 6 one of the walls of the carriage 29 is provided with a bore in which a ball 29' is located, this ball extending to the left, as viewed in FIG. 6, beyond the wall of the carriage 29 and being engaged by a leaf spring 29'' fixed to the wall of carriage 29 by a screw 29''' or a similar fastening element, so that the spring urges the ball 29' inwardly toward the element 31 to engage the latter with a light pressure. The element 31 is formed with a depression 31" into which the ball 29' snaps when the element 31 has been raised to an inoperative position through actuation of the lever 31'.

The length of the feeding stroke of the carriage 29 changes with a change in the size of the angle $a$ which is formed between a line connecting the axes of the pivot pins 26 and 28 and a line extending horizontally through the axis of the pivot pin 28 when the tool carrier means 10 is in its upper dead center position. Assuming that the stroke of the tool carrier means 10 remains the same, then when the motion transmitting member is adjusted to a lower position with respect to the tool carrier means 10 the angle $a$ will be reduced and the stroke of the carriage 29 will be reduced, while when the ring 13 is adjusted to a higher elevation with respect to the tool carrier means 10, the angle $a$ will be increased and the stroke of the carriage 29 will increase. It is also possible to change the stroke of the carriage 29 by changing the length of the connecting rod 27, and for this purpose the element 27 may be made up of a pair of coaxial members which may be shifted axially one with respect to the other and adjustedly fixed to each other in a desired axial position with respect to each other so that the length of the element 27 may be adjusted in this way.

Of course, if the size of the angle $a$ should become too great, the frictional resistance to the movement of the carriage 29 along the guide means 22 will become too great, so that there is a practical upper limit to the size of the angle $a$, and the structure of the invention provides a means which automatically prevents the angle $a$ from exceeding this limit. For this purpose the pin 24 is arranged so that it is axially slidable through the bore of the carriage 23. A spring means cooperates with the pin 24 to urge the latter toward the axis of the tool carrier means 10. Thus, it will be seen that the pin 24 is provided at its end distant from the tool carrier means 10 with a projection 38, and a leaf spring 36 which is fixed to the link 27 acts on the projection 38 to urge the pin 24 radially toward the axis of the tool carrier means 10 into the groove 14. The link 27 is itself provided at its upper end with a projection 37 located next to the projection 38 between the latter and the tool carrier means 10. Thus, when the ring 13 reaches a certain elevation the projection 37 will engage the projection 38 and move the pin 24 in opposition to the spring 36 radially away from the axis of the tool carrier means 10 out of the cutout 14. In this way the parts 13 and 24 are automatically disengaged when the part 13 reaches a predetermined elevation, and thus the movement of the ring 13 cannot be transmitted to the carriage 29 when the ring 13 moves about a certain elevation. It will be noted that the end 25 of the pin 24 becomes located out of the groove 14 before this end 25 of the pin 24 moves radially beyond the flange 15. Therefore, during the next downward movement of the ring 13 with the tool carrier means 10 the flange 15 will engage the end 25 of the pin 24 to move the latter downwardly together with the carriage 23, and the spring 36 will automatically act on the projection 38 to move the pin 24 back to the position shown in FIG. 1 where its end 25 is received in the groove 14, so that the work feeding means is automatically placed in operative engagement with the machine part 13 when the latter is below a certain elevation.

Since it is possible to turn the plates 16 and 33 with all of the structure carried thereby around the axis of the tool carrier means 10, it is possible to cut along a curved path with the structure shown in FIG. 1.

Instead of the illustrated transmission between the tool carrier means 10 and the carriage 23, it is possible to provide between these parts on the housing 18 a pivotally supported two-armed lever having one end connected with a pin fixed to the tool carrier means 10 or the ring 13, while the other end of this lever is in operative engagement with a carriage which is vertically movable in the same way as the carriage 23. Then this latter carriage is connected with a second carriage so as to move the latter in the feeding direction during the upward movement of the tool carrier means 10, and to feed this second carriage in the opposite direction during the downward movement of the tool carrier means 10.

For the same purpose, it is possible to provide instead of such a two-armed lever a gear which is turnable about its axis and meshes with teeth carried by or formed in the tool carrier means 10 or the ring 13 as well as with teeth in a vertically movable carriage similar to the carriage 23, so that with such an arrangement it is also possible to transmit movement to the carriage 29 depending upon the direction of movement of the tool carrier means 10 so as to automatically feed the work during the return stroke of the tool.

FIGS. 2–5 show a particular embodiment of the work-engaging means 31. This means includes a plate 41 having the peripheral portion 50 extending along a logarithmic spiral, as pointed out above, and this plate is formed along its peripheral portion 50 with a plurality of notches respectively extending perpendicularly to tangents to the peripheral portion 50 at these notches. These notches serve the purpose of receiving portions of teeth 40 which directly engage the work. Each of the teeth 40 has opposed end faces which are oppositely inclined with respect to each other, as indicated in FIG. 3, and a pair of side plates 44 are clamped to the plate 41 by the screw member 45 and have lower peripheral projections 43 which cooperate with the oppositely inclined ends of the teeth 40 to fix the latter to the plate 41 in the manner shown most clearly in FIG. 3. A dowel 47 passes through aligned openings of the plates 44 and 41 to guarantee that the parts are properly positioned with respect to each other. The configuration of each tooth 40 is illustrated most clearly in FIG. 5.

Each tooth 40 is made of a ductile wear-resistant material and is preferably hardened and ground. In order to exchange the positions of the teeth 40 with respect to each other or in order to exchange old teeth 40 for new teeth 40, it is only necessary to remove the side plates 44. This easy exchangeability of the teeth 40 is of particular significance because the teeth are especially subjected to relatively high wear when they operate over a considerable period of time with work sheets of the same thickness, because under these circumstances the same teeth 40 of the member 31 will always engage the work sheet.

It is possible to provide a uniform pressure of the member 31 with respect to the work sheet irrespective of the angular position of the member 31 when the logarithmic curve of the work-engaging periphery of the member 31 is replaced by an arc of a circle whose center 48 is displaced with respect to the turning axis of the member 31. Thus, FIG. 4 shows a construction where the center 48 of the circular periphery 50 of the work-engaging means 31 is displaced with respect to the turning axis of the means 31. As is shown in FIGS. 2 and 4, the plate 41 and plate 44 are formed with aligned openings forming a bore 42 passing completely through the device and the pivot pin 39 passes through this bore 42. Instead of individual teeth 40, it is possible to provide a toothed band which is inserted between the plate 44 along that periphery of the plate 41 which is directed toward the plate of the work sheet.

It will be understood that each of the elements described above, or two or more together, may also find a useful application in other types of automatic feed for machine tools differing from the types described above.

While the invention has been illustrated and described as embodied in automatic intermittent feeds for machine tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a machine for working on a work sheet located in a predetermined plane, in combination, tool carrier means reciprocable along a given axis normal to said plane toward and away from the latter so that a tool carried by said tool carrier means will move back and forth through said plane to work on a work sheet in said plane; first guide means located adjacent to said tool carrier means and extending parallel to said axis; support means supporting said first guide means for bodily movement about said given axis; a first carriage movable back and forth along said guide means; a pin extending from said first carriage radially toward said axis; a motion transmitting member fixed to said tool carrier means for movement therewith and formed with an arcuate cutout extending along a circle whose center is in said given axis and which is located in a plane parallel to said predetermined plane, said pin extending into said cutout so that said first carriage moves together with said tool carrier means in a direction parallel to said given axis while said first carriage together with said first guide means is turnable about said given axis while remaining operatively connected to said motion transmitting member; second guide means extending radially with respect to said axis and fixed to said first guide means; a second carriage movable back and forth along said second guide means; a link pivotally connected to said first and second carriages for transmitting movement of said first carriage to said second carriage; and work engaging means carried by said second carriage for engaging and moving work only during movement of said second carriage in one direction along said second guide means.

2. In a machine for working on a work sheet located in a predetermined plane, in combination, tool carrier means reciprocable along a given axis normal to said plane toward and away from the latter so that a tool carried by said tool carrier means will move back and forth through said plane to work on a work sheet in said plane; first guide means located adjacent to said tool carrier means and extending parallel to said axis; support means supporting said first guide means for bodily movement about said given axis a first carriage movable back and forth along said guide means; a pin extending from said first carriage radially toward said axis; a motion transmitting member fixed to said tool carrier means for movement therewith and formed with an arcuate cutout extending along a circle whose center is in said given axis and which is located in a plane parallel to said predetermined plane, said pin extending into said cutout so that said first carriage moves together with said tool carrier means parallel to said given axis while said first carriage and said first guide means are movable together about said axis while said first carriage remains operatively connected to said motion transmitting member; second guide means extending radially with respect to said axis and fixed to said first guide means; a second carriage movable back and forth along said second guide means; a link pivotally connected to said first and second carriages for transmitting movement of said first carriage to said second carriage; work engaging means carried by said second carriage for engaging and moving work only during movement of said second carriage in one direction along said second guide means; and means for adjusting the position of said motion transmitting member along said axis.

3. In a machine for working on a work sheet located in a predetermined plane, in combination, tool carrier means reciprocable along a given axis normal to said plane toward and away from the latter so that a tool carried by said tool carrier means will move back and forth through said plane to work on a work sheet in said plane; first guide means located adjacent to said tool carrier means and extending parallel to said axis; support means supporting said first guide means for bodily movement about said given axis; a first carriage movable back and forth along said guide means; a pin extending from said first carriage radially toward said axis; a motion transmitting member fixed to said tool carrier means for movement therewith and formed with an arcuate cutout extending along a circle whose center is in said given axis and which is located in a plane parallel to said predetermined plane, said pin extending into said cutout so that said first carriage moves together with said tool carrier means in a direction parallel to said given axis while said first carriage is movable together with said first guide means about said given axis; second guide means extending radially with respect to said axis and fixed to said first guide means; a second carriage movable back and forth along said second guide means; a link pivotally connected to said first and second carriages for transmitting movement of said first carriage to said second carriage; and work engaging means carried by said second carriage for engaging and moving work only during movement of said second carriage in one direction along said second guide means, said first carriage being formed with a bore through which said pin slidably extends.

4. In a machine for working on a work sheet located in a predetermined plane, in combination, tool carrier means reciprocable along a given axis normal to said plane toward and away from the latter so that a tool carried by said tool carrier means will move back and forth through said plane to work on a work sheet in said plane; first guide means located adjacent to said tool carrier means and extending parallel to said axis; a first carriage movable back and forth along said first guide means, a pin extending from said first carriage radially toward said axis; a motion transmitting member fixed to said tool carrier means for movement therewith and formed with a cutout into which said pin extends so that said first carriage moves together with said tool carrier means; second guide means extending radially with respect to said axis; a second carriage movable back and forth along said second guide means; a link pivotally connected to said first and second carriages for transmitting movement of said first carriage to said second carriage; work engaging means carried by said second carriage for engaging and moving work only during movement of said second carriage in one direction along said second guide means, said first carriage being formed with a bore through which said pin slidably extends; and means cooperating with said pin for moving the same radially away from said axis to a position out of engagement with said motion transmitting member when the latter becomes located at a predetermined distance from said plane.

5. In a machine for working on a work sheet located in a predetermined plane, in combination, tool carrier means reciprocable along an axis normal to said plane toward and away from the latter so that a tool carried by said tool carrier means can move back and forth through said plane; first guide means located adjacent to said tool carrier means and extending parallel to said axis; a first carriage movable back and forth along said first guide means and formed with a bore passing through said first carriage; a pin extending slidably through said bore radially toward said axis; a motion transmitting member fixed to said tool carrier means for movement therewith and formed with a cutout into which said pin extends so that said first carriage moves with said tool carrier means; second guide means extending radially with respect to said axis; a second carriage movable back and forth along said second guide means toward and away from said axis; work engaging means carried by said second carriage for movement therewith and engaging a work sheet to move the latter with respect to said axis only during movement of said second carriage in one direction along said second guide means; a link having a pair of opposed ends respectively connected pivotally with said first and second carriages so that movement of said first carriage is transmitted to said second carriage; a projection fixed to said pin at an end thereof distant from said axis; spring means engaging said projection for urging the latter and said pin therewith toward said axis; and a second projection fixed to said link and located next to said first-mentioned projection between the latter and said axis so that turning of said link causes said second projection to engage said first mentioned projection for moving said pin in opposition to said spring means away from said axis, whereby when said motion transmitting member is at a predetermined distance from said plane said pin will have been moved radially away from said axis to a position out of engagement with said motion transmitting member.

6. In a machine as recited in claim 5, said cutout of said motion transmitting member being located between a pair of portions of said motion transmitting member one of which is located nearer to said plane than the other, and said other portion of said motion transmitting member being located at a greater radial distance from said axis than said one portion thereof so that when said pin has been moved radially away from said axis beyond said one portion of said motion transmitting member the latter can continue to move away from said plane without also moving said pin away from said plane, whereby when said motion transmitting member returns toward said plane said other portion thereof will engage said pin to move the latter and said first carriage therewith back toward said plane.

7. In a nibbling machine for cutting through a sheet of work located in a given plane, in combination, first support means; first tool carrier means mounted on said first support means reciprocable along a given axis normal to said plane for moving a tool carried by said tool carrier means along work and return strokes; a housing adjacent to said tool carrier means and having a first guide means extending parallel to said axis and a second guide means extending radially with respect to said axis; means supporting said housing on said first support means for turning movement about said given axis; first and second carriages respectively movable back and forth along said first and second guide means; mechanical motion transmitting means connecting said tool carrier means to said first carriage at all angular positions of said housing with respect to said given axis for reciprocating said first carriage along said first guide means during reciprocation of said first tool carrier means; a link pivotally connected to said carriages for moving said second carriage along said second guide means in response to movement of said first carriage along said first guide means; work engaging means carried by said second carriage for movement therewith and engaging the sheet of work on one face thereof to advance the same only during movement of said second carriage in one direction along said second guide means; second support means spaced in direction of said given axis from said first support means; second tool means mounted on said second support means substantially coaxial with said first tool means; a roll engaging the other face of the sheet of work in a region opposite the region engaged by said work engaging means; and roll supporting means for supporting said roll turnable about an axis substantially normal to said given axis, said roll supporting means being mounted on said second support means also turnable about said given axis.

References Cited in the file of this patent

UNITED STATES PATENTS

| Re. 4,927 | Anderson | June 4, 1872 |
| 421,195 | Ross | Feb. 11, 1890 |
| 2,342,049 | Holmbeck | Feb. 15, 1944 |
| 2,428,231 | Leschin | Sept. 30, 1947 |
| 2,742,142 | Paulsen | Apr. 17, 1956 |

FOREIGN PATENTS

| 648,397 | Germany | July 30, 1937 |
| 846,904 | France | Sept. 28, 1939 |